Patented Sept. 7, 1943

2,328,958

UNITED STATES PATENT OFFICE 2,328,958

TRIAZINE DERIVATIVES

Gaetano F. D'Alelio and James W. Underwood, Pittsfield, Mass., assignors to General Electric Company, a corporation of New York No Drawing. Application August 26, 1942, Serial No. 456,261

10 Claims. (Cl. 260—249.5)

This invention relates to new chemical compounds and more particularly to triazine derivatives. The invention especially is concerned with the production of new and useful bis-triazinyl carbazides.

The triazine derivatives of this invention may be represented by the following general formula:

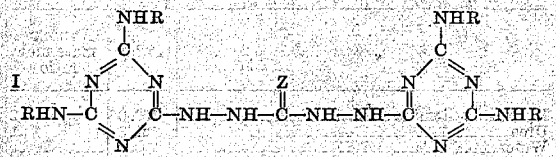

where R represents a member of the class consisting of hydrogen and monovalent hydrocarbon and substituted hydrocarbon radicals, more particularly halo-hydrocarbon radicals; and Z represents a member of the class consisting of oxygen and sulfur.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R in Formula I is hydrogen.

The new compounds of this invention may be used, for example, as pharmaceuticals, plasticizers and as intermediates in the preparation of derivatives thereof, e. g., hydrazino, ureido, amidine, methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 456,259, filed concurrently herewith and assigned to the same assignee as the present invention.

Various methods may be employed to produce the chemical compounds of this invention. One suitable method comprises effecting reaction, in the presence of a hydrohalide acceptor, between (1) a carbonyl or thiocarbonyl chloride or bromide and (2) a hydrazino diamino [(—NHR)₂] s-triazine in the ratio of one mol of the former to at least two mols of the latter. This reaction may be represented by the following general equation:

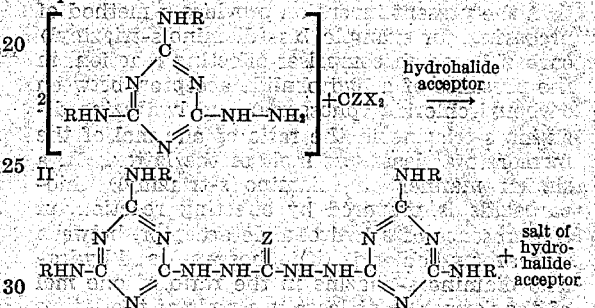

In the above equation X represents a halogen of the class consisting of chlorine and bromine, and R and Z have the same meanings as given above with reference to Formula I.

Illustrative examples of hydrazino-substituted triazines that may be employed, depending upon the particular end-product desired, are listed below:

Hydrazino diamino s-triazine, which also may be named 2-hydrazino 4,6-diamino s-triazine, 4-hydrazino 2,6-diamino s-triazine or 6-hydrazino 2,4-diamino s-triazine
Hydrazino di-(methylamino) s-triazine
Hydrazino di-(ethylamino) s-triazine
2-hydrazino 4-methylamino 6-amino s-triazine
2-hydrazino 4-ethylamino 6-amino s-triazine
2-hydrazino 4-ethylamino 6-methylamino s-triazine
Hydrazino di-(pentylamino) s-triazine
Hydrazino di-(isobutylamino) s-triazine
Hydrazino di-(propenylamino) s-triazine
Hydrazino di-(butenylamino) s-triazine
Hydrazino dianilino s-triazine [hydrazino di-(phenylamino) s-triazine]

2-hydrazino 4-anilino 6-amino s-triazine
2-hydrazino 4-anilino 6-methylamino s-triazine
Hydrazino ditoluido s-triazine
Hydrazino dixylidino s-triazine
Hydrazino di-(naphthylamino) s-triazine
Hydrazino di-(ethylphenylamino) s-triazine
Hydrazino di-(phenethylamino) s-triazine
Hydrazino di-(cinnamylamino) s-triazine
Hydrazino di-(chloromethylamino) s-triazine
Hydrazino di-(bromoethylamino) s-triazine
Hydrazino di-(chloroanilino) s-triazine
Hydrazino di-(bromotoluido) s-triazine
Hydrazino di-(iodoanilino) s-triazine
Hydrazino di-(fluorotoluido) s-triazine
Hydrazino di-(cyclohexylamino) s-triazine
Hydrazino di-(cyclopentenylamino) s-triazine
Hydrazino di-(octylamino) s-triazine Various hydrohalide acceptors may be employed but we prefer to use a tertiary base, e. g., tertiary amines such as trialkyl (e. g., trimethyl, triethyl, tripropyl, tributyl, etc.) amines, triaryl (e. g., triphenyl, tritolyl, etc.) amines, pyridine, dimethyl aniline, etc. The reaction between the hydrazino-substituted triazine and the carbonyl or thiocarbonyl chloride or bromide may be carried out in any suitable manner, but preferably is effected in the presence of a suitable solvent or mixture of solvents. It is advisable to use an anhydrous medium as the solvent, e. g., ether, benzene, toluene, etc., because of the high degree of reactivity of the halide reactant. The reaction may be carried out under a variety of temperature and pressure conditions, for example at normal, sub-normal or at elevated temperatures and at atmospheric, sub-atmospheric or super-atmospheric pressures.

From the foregoing description it will be seen that the present invention provides a method of preparing, for example, bis-(diamino s-triazinyl) carbazide which comprises effecting reaction, in the presence of a hydrohalide acceptor, between carbonyl chloride (phosgene) and hydrazino diamino s-triazine in the ratio of one mol of the former to at least two mols of the latter. In a similar manner bis-(diamino s-triazinyl) thiocarbazide is prepared by effecting reaction, in the presence of a hydrohalide acceptor, between thiocarbonyl chloride (thiophosgene) and hydrazino diamino s-triazine in the ratio of one mol of the former to at least two mols of the latter.

Another method of preparing the new chemical compounds of this invention comprises effecting reaction under heat, preferably in aqueous solution, between (1) a hydrazino diamino -[(—NHR)₂] s-triazine, numerous examples of which have been given above, and (2) urea or thiourea. This reaction may be represented by the following general equation:

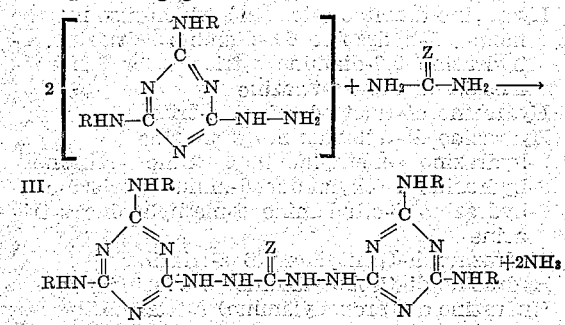

In this equation R and Z have the same meanings as given above with reference to Formula I. Instead of water, other solvents or mixtures of solvents may be employed, e. g., alcohol or a mixture of alcohol and water. The reaction may be effected at atmospheric, sub-atmospheric or super-atmopheric pressures, but preferably is effected at atmospheric pressure. In all cases it is necessary to carry out the reaction under conditions such as will result in the formation of ammonia as a by-product of the reaction. The following examples are illustrative of this method of preparing the new chemical compounds of this invention. All parts are by weight.

*Example 1*

This examaple illustrates the preparation of bis-(diamino s-triazinyl) carbazide, the formula for which is

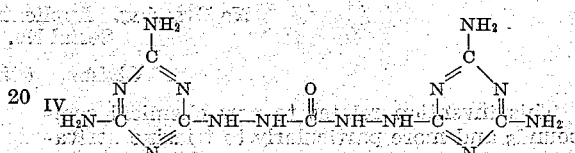

and which also may be named bis-(4,6-diamino s-triazinyl-2) carbazide, bis-(2,6-diamino s-triazinyl-4) carbazide, or bis-(2,4-diamino s-triazinyl-6) carbazide.

|  | Parts | Approximate mol ratio |
| --- | --- | --- |
| Hydrazino diamino s-triazine | 100.0 | 2 |
| Urea | 21.3 | 1 |
| Water | 200.0 |  | were heated together under reflux at the boiling temperature of the mass for 16 hours, at the end of which period of time the odor of ammonia no longer could be detected. The precipitated product comprising bis-(diamino s-triazinyl) carbazide was filtered off, washed well with water and dried. A yield of 102 parts of the purified product was obtained.

*Example 2*

Bis-(diamino s-triazinyl) thiocarbazide is prepared in essentially the same manner as described under Example 1 with the exception that 27 parts thiourea are used in place of 21.3 parts urea.

*Example 3*

Bis-(4-methylamino 6-amino s-triazinyl-2) carbazide is prepared in essentially the same manner as described under Example 1 with the exception that 110 parts of 2-hydrazino 4-methylamino 6-amino s-triazine are used in place of 100 parts of hydrazino diamino s-triazine.

*Example 4*

Bis-[4,6-di-(ethylamino) s-triazinyl-2] carbazide, which also may be named bis-[di-(ethylamino) s-triazinyl] carbazide, is prepared in essentially the same manner as described under Example 1 with the exception that 139.7 parts of hydrazino di-(ethylamino) s-triazine are used instead of 100 parts of hydrazino diamino s-triazine.

*Example 5*

Bis-(4,6-dianilino s-triazinyl-2) carbazide, which also may be named bis-(dianilino s-triazinyl) carbazide, is prepared in essentially the same manner as described under Example 1 with the exception that 207.9 parts of hydrazino dianilino s-triazine are used in place of 100 parts of hydrazino diamino s-triazine.

Examples of other compounds embraced by Formula I that may be produced in accordance with the present invention are listed below:

Bis-[4,6-di-(methylamino) s-triazinyl-2] carbazide
Bis-[4,6-di-(methylamino) s-triazinyl-2] thiocarbazide
Bis - [4,6 - di-(pentylamino) s-triazinyl-2] carbazide
Bis-[4,6-di-(propylamino) s-triazinyl-2] thiocarbazide
Bis-[4,6-di-(isobutylamino) s-triazinyl-2] carbazide
Bis-[4,6-di-(hexylamino) s-triaziny-2] thiocarbazide
Bis-[4,6-di-(butenylamino) s-triazinyl-2] carbazide
Bis-[4,6-di-(propenylamino) s-triazinyl-2] thiocarbazide
Bis-(4,6-dianilino s-triazinyl-2) thiocarbazide
Bis-(4,6-ditoluido s-triazinyl-2) carbazide
Bis-(4,6-ditoluido s-triazinyl-2) thiocarbazide
Bis-[4,6-di-(chloroanilino) s-triazinyl-2] carbazide
Bis-[4,6-di-(bromoanilino) s-triazinyl-2] thiocarbazide
Bis-[4,6-di-(fluoroanilino) s-triazinyl-2] carbazide
Bis-[4,6-di-(iodotoluido) s-triazinyl-2] thiocarbazide
Bis-(4,6-dixylidino s-triazinyl-2) carbazide
Bis-(4,6-dixylidino s-triazinyl-2) thiocarbazide
Bis-[4,6-di-(naphthylamino) s-triazinyl-2] carbazide
Bis-(4-ethylamino 6-amino s-triazinyl-2) carbazide
Bis-(4-allylamino 6-amino s-triazinyl-2) thiocarbazide
Bis-(4-anilino 6-amino s-triazinyl-2) carbazide
Bis-(4-anilino 6-methylamino s-triazinyl-2) carbazide
Bis - (4-methallylamino 6-amino s-triazinyl-2) carbazide
Bis-(4-chloroethylamino 6-amino s-triazinyl-2) carbazide
Bis-(4-anilino 6-amino s-triazinyl-2) thiocarbazide
Bis - [4,6-di-(ethylphenylamino) s-triazinyl-2] carbazide
Bis-[4,6-di-(diethylphenylamino) s-triazinyl-2] thiocarbazide
Bis - [4,6-di(methylnaphthylamino) s-triazinyl-2] carbazide
Bis - [4,6 - di-(cyclohexylamino) s-triazinyl-2] carbazide
Bis - [4,6 - (propenylanilino) s - trianzinyl - 2] carbazide
Bis-[4,6-di-(cyclohexenylamino) s-triazinyl-2] carbazide
Bis - [4,6 - di - (phenethylamino) s-triazinyl - 2] carbazide
Bis - [4,6 - di-(phenylbutylamino) s-triazinyl-2] carbazide
Bis - [4,6 - di - (chloroethylamino) s-triazinyl-2] carbazide
Bis - [4,6 - di-(bromoethylamino) s-triazinyl-2] thiocarbazide
Bis-[4,6-di-(dichlorotoluido) s-triazinyl-2] carbazide In a manner similar to that described above with particular reference to the production of bis-s-triazinyl carbazides, that is, bis-(symmetrical triazinyl) carbazides, corresponding derivatives of the asymmetrical triazines and of the vicinal triazines may be prepared.

What we claim as new and desire to secure by Letters Patent of the United States is:

1. Chemical compounds corresponding to the general formula

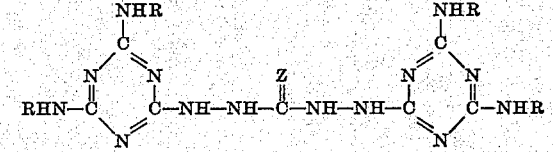

where R represents a member of the class consisting of hydrogen and monovalent hydrocarbon and halo-hydrocarbon radicals, and Z represents a member of the class consisting of oxygen and sulfur.

2. Chemical compounds as in claim 1 wherein R represents hydrogen.

3. Chemical compounds as in claim 1 wherein Z represents oxygen.

4. Chemical compounds as in claim 1 where Z represents sulfur.

5. Bis-(diamino s-triazinyl) carbazide.

6. Bis-(diamino s-triazinyl) thiocarbazide.

7. Bis-(dianilino s-triazinyl) carbazide.

8. The method of preparing chemical compounds corresponding to the general formula

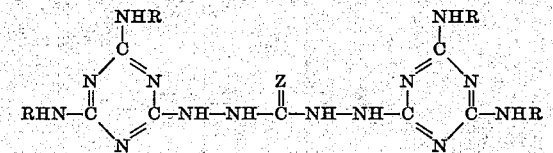

where R represents a member of the class consisting of hydrogen and monovalent hydrocarbon and halo-hydrocarbon radicals, and Z represents a member of the class consisting of oxygen and sulfur, said method comprising effecting reaction, in the presence of a hydrohalide acceptor, between (1) a halide represented by the general formula $$CZX_2$$

where Z represents a member of the class consisting of oxygen and sulfur and X represents a halogen of the class consisting of chlorine and bromine, and (2) a hydrazino-substituted triazine corresponding to the general formula

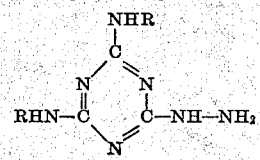

where R has the meaning above given, the said reactants being employed in the ratio of at least two mols of the hydrazino-substituted triazine of (2) per mol of the halide of (1).

9. The method of preparing bis-(diamino s-triazinyl) carbazide which comprises effecting reaction, in the presence of a hydrohalide acceptor, between carbonyl chloride and hydrazino diamino s-triazine in the ratio of one mol of the former to at least two mols of the latter.

10. The method of preparing bis-(diamino s-triazinyl) thiocarbazide which comprises effecting reaction, in the presence of a hydrohalide acceptor, between thiocarbonyl chloride and hydrazino diamino s-triazine in the ratio of one mol of the former to at least two mols of the latter.

GAETANO F. D'ALELIO.
JAMES W. UNDERWOOD.

CERTIFICATE OF CORRECTION.

Patent No. 2,328,958. September 7, 1943.

GAETANO F. D'ALELIO, ET AL.

It is hereby certified that error appears in the printed specification of the above numbered patent requiring correction as follows: Page 2, second column, line 14, for "examaple" read --example--; page 3, first column, line 53, for "4,6-di" read -- 4,6-di- --; line 57, for "4,6-(propenylanilino) s-trianzinyl-2" read --4,6-di-(propenylanilino) s-triazinyl-2--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.